July 22, 1941.   A. NEVEU   2,249,974
FLUID PRESSURE MOTOR DEVICE
Filed Dec. 23, 1939   3 Sheets-Sheet 1
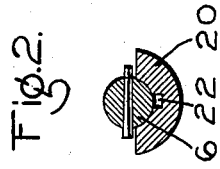
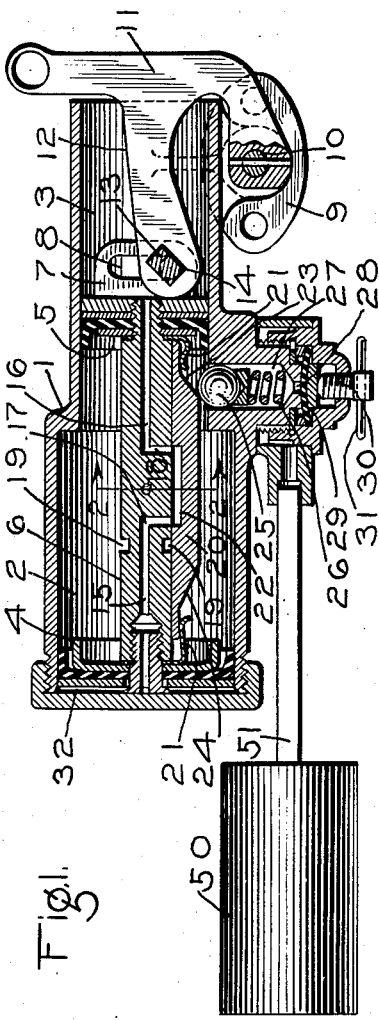
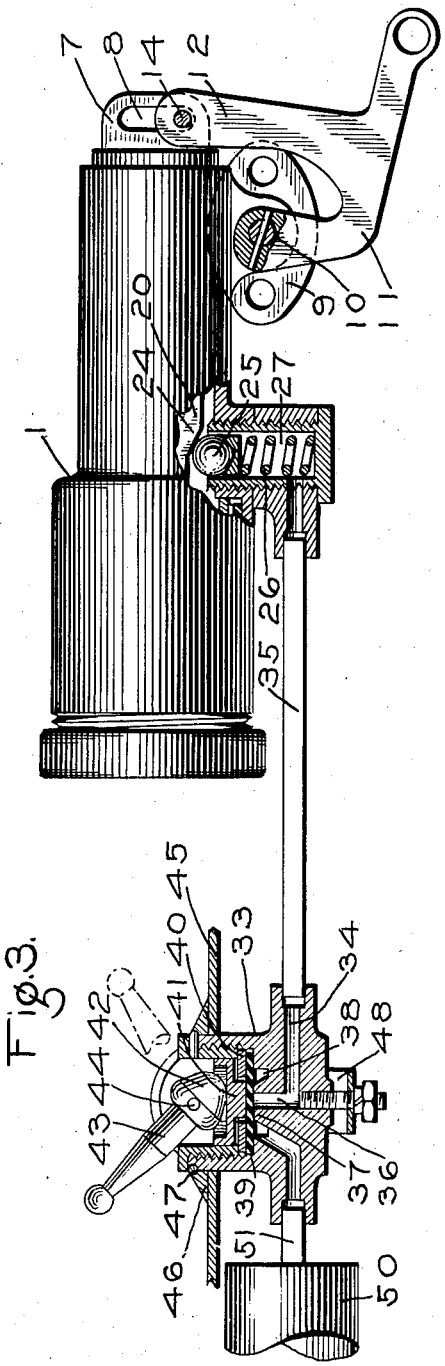
INVENTOR
ANSELME NEVEU
BY
ATTORNEY July 22, 1941.  A. NEVEU  2,249,974
FLUID PRESSURE MOTOR DEVICE
Filed Dec. 23, 1939  3 Sheets-Sheet 2
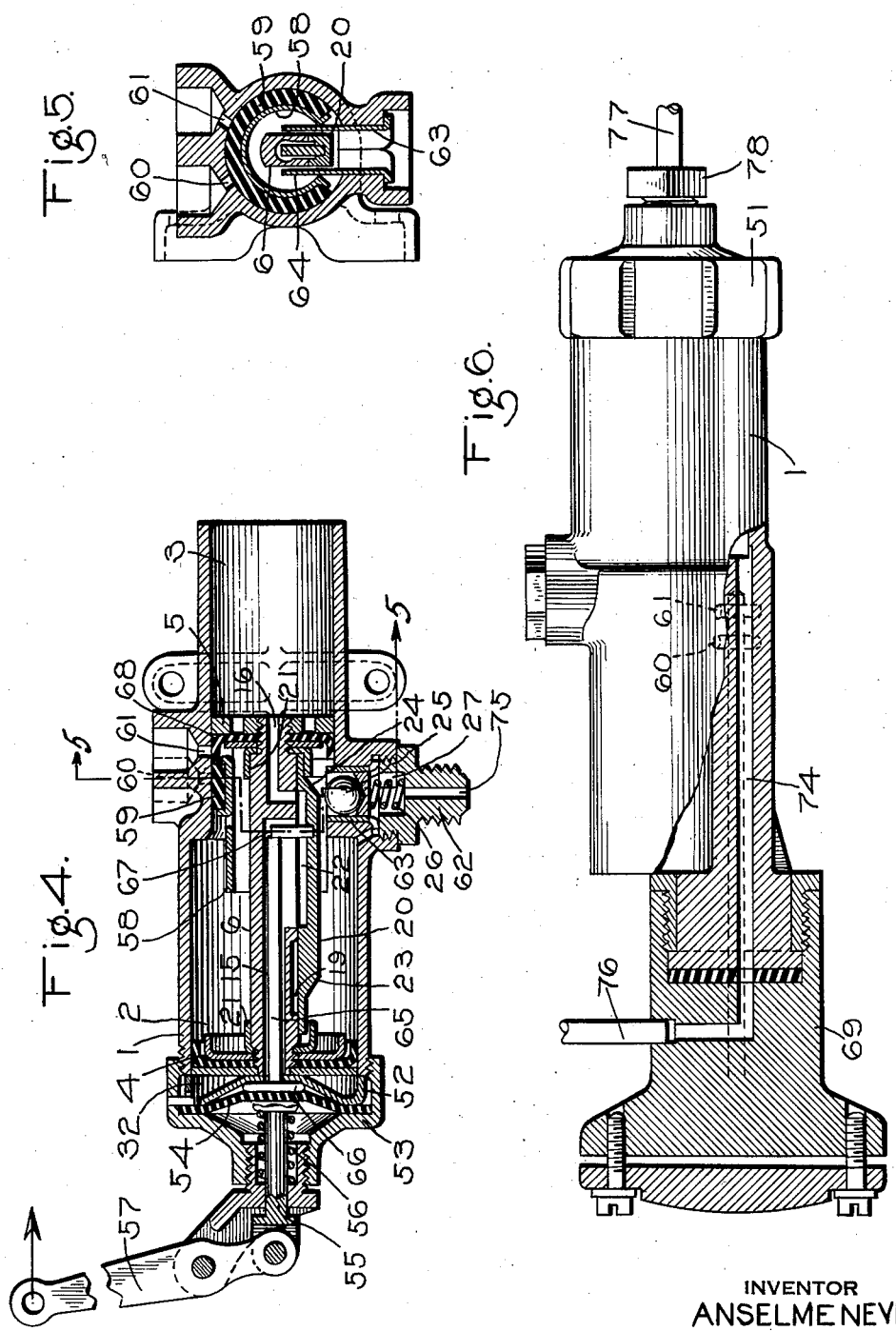
INVENTOR
ANSELME NEVEU
BY
ATTORNEY

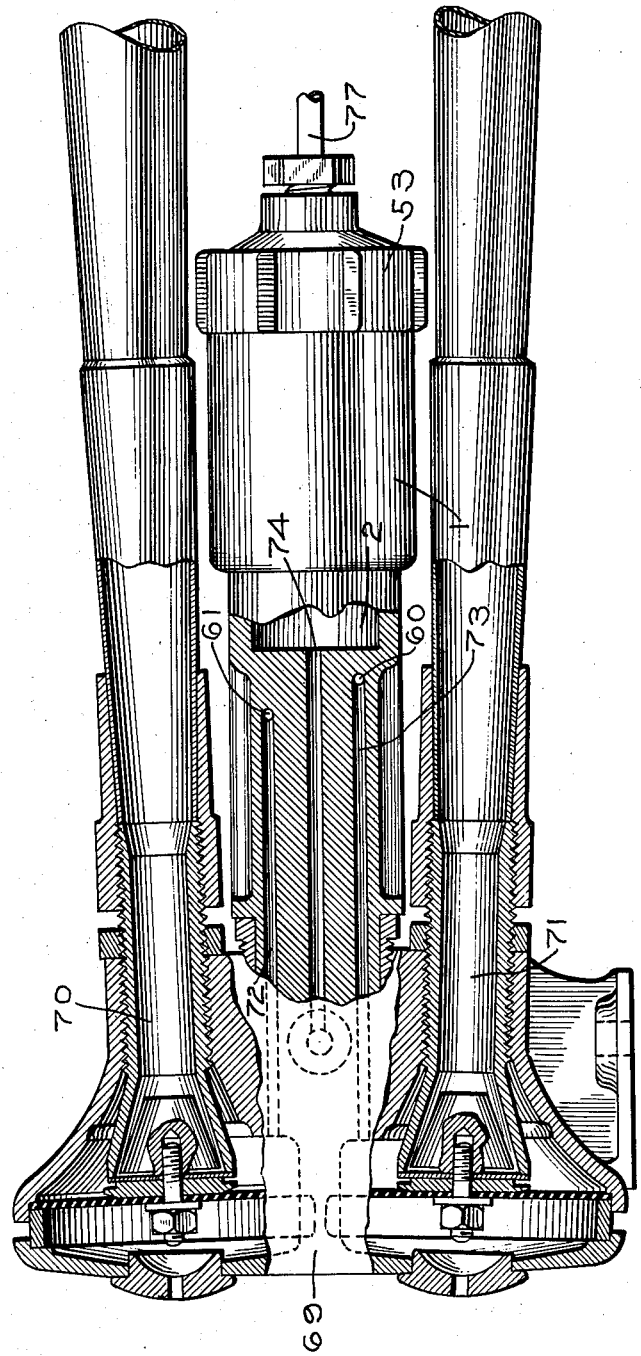

Patented July 22, 1941

2,249,974

UNITED STATES PATENT OFFICE 2,249,974

FLUID PRESSURE MOTOR DEVICE

Anselme Neveu, Livry-Gargan, France, assignor, by mesne assignments, to The Westinghouse Air Brake Company, Wilmerding, Pa., a corporation of Pennsylvania Application December 23, 1939, Serial No. 310,801
In France May 31, 1939

18 Claims. (Cl. 121—123)

This invention relates to motor devices actuated by fluid under pressure and has for its object to provide an improved device of this character which shall be particularly simple in construction and reliable in operation.

The invention is illustrated by way of example in the accompanying drawings of which Fig. 1 is a view in sectional elevation of a form of motor device embodying the invention, the valve for controlling the operation of the device being combined therewith.

Fig. 2 is a detail sectional view of a portion of the mechanism of Fig. 1.

Fig. 3 is a view similar to Fig. 1 of an alternative construction in which the control valve is separate from the motor device so as to permit remote control of the device.

Fig. 4 is a view in section of a modified construction embodying the invention, and adapted for mechanical control.

Fig. 5 is a transverse sectional view taken on the line 5—5 of Fig. 4 with some of the parts omitted.

Fig. 6 is a view in elevation partly sectional of a modified construction adapted for pneumatic control.

Fig. 7 is a view in elevation partly sectional of the construction shown in Fig. 6 combined with a horn device forming part of the apparatus.

Referring now first to Figs. 1 and 2, it will be seen that the motor device comprises a body or casing 1 within which are formed a cylinder 2 of larger diameter and a cylinder 3 of smaller diameter. Two corresponding pistons 4 and 5, rigidly connected together by a stem or rod 6, are adapted to move in the cylinders 2 and 3, respectively. The outer side of the smaller piston 5 is provided with a pair of parallel lugs or extensions, one of which is indicated at 7, each of these lugs having an elongated slot 8 formed therein. An external flange extension 9 is formed integral with the body 1 serving for the mounting of the motor device on any suitable support.

Pivotally mounted at 10 on the extension 9 is a rocking lever 11, one arm 12 of which is operatively coupled to the lugs 7 by means of a pivot pin. The latter comprises a rectangular portion 13 on each side of which is a trunnion, one of which is indicated in dotted lines at 14. The rectangular portion 13 of the pivot pin is of the same transverse thickness as the arm 12, and fits into a corresponding rectangular opening in this arm, the pin being inserted into position by moving the lever 11 to a position in which the rectangular portion 13 of the pivot pin can pass through the slot 8 in one of the lugs until it lies in the opening in the arm 12. When the lever 11 is then restored to its normal position, the pivot pin will evidently be locked in position in the arm 12 with its trunnions 14 lying in the slots 8 in the lugs 7.

The stem or rod 6 is provided with internal passages 15 and 16 leading to the outer faces of the pistons 4 and 5 respectively, and terminating in ports 17 and 18, in the stem or rod 6 which is also provided with an annular groove 19.

Engaging with the lower part of the stem or rod 6 is a valve member 20 adapted to slide relative to the stem or rod 6 in spring guides 21 mounted on the stem or rod, the valve member 20 being provided with a cavity 22 adapted to register with the ports 17 and 18 in the stem or rod 6.

The lower face of the valve member 20 is provided at each end with inclined ramps 23 and 24, adapted to cooperate with a ball 25 which is maintained in contact with the valve member 20 by means of an operating spring 26 arranged in a cylindrical chamber 27 through which fluid under pressure is adapted to be supplied to the cylinder 2. The control valve for this supply of fluid under pressure comprises a valve port 28 formed in the base of the chamber 27 and cooperates with a flexible diaphragm 29 which is arranged to be operated by a screw 30 provided with a handle 31 so as to open or close the port 28 and thereby control the supply of fluid under pressure from a charged reservoir 50 to the chamber 27 by way of a supply pipe 51, the charging of the reservoir being accomplished in any desired manner.

The operation of the device is as follows:

When the motor device is to be operated, the screw 30 is rotated by means of the handle 31 so as to permit the diaphragm 29 to move away from the valve port 28 whereupon fluid is supplied from the reservoir 50 by way of pipe 51 through the port 28 to the chamber 27 and thence to the cylinder 2. The fluid under pressure acting in the cylinder 2 will evidently move the pistons 4 and 5, and the stem or rod 6 towards the left owing to the piston 4 being of larger area than the piston 5. Assuming that the valve member 20 occupies the position shown in Fig. 1, as is the case during this movement and until the pistons have reached the end of their movement towards the left, the cavity 22 registers with the ports 17 and 18 so that the space 32 is in comunication with the atmosphere by way of passage 15, port 17, cavity 22, port 18 and passage 16. Under these conditions, the outer faces of the pistons 4 and 5 are evidently both subject to atmospheric pressure so that the pistons are moved freely towards the positions shown by the fluid pressure in the cylinders 2 and 3 between the pistons 4 and 5.

As soon as the pistons 4 and 5 have substantially attained the position shown in Fig. 1, the upward pressure of the ball 25 on the inclined ramp 23 due to the action of the spring 26 will cause the valve member 20 to slide along the stem or rod 6 towards the left within its guides 21 thereby causing the cavity 22 in the member 20 to establish communication between the annular groove 19 and the port 17. At the same time the valve member 20 cuts off communication between cavity 22 and port 18.

Fluid under pressure will then flow from the cylinder 2 through groove 19, cavity 22, port 17 and passage 15 to the space 32 on the outer side of piston 4. The pressure in this space 32 acting upon the full area of the piston 4 in opposition to the same pressure acting differentially on the inner faces of the pistons 4 and 5 will evidently move the pistons 4 and 5 and stem or rod 6 towards the right, carrying with them the valve member 20. As soon as the pistons and stem or rod have substantially attained their extreme right-hand positions, the ball 25 acting on the inclined ramp 24 will return the member 20 to the position relative to the stem or rod 6 shown in Fig. 1. The cavity 22 now again registers with the ports 17 and 18, so that the space 32 is again in communication with the atmosphere through the passages 15 and 16 and the cavity 22 and the pistons 4 and 5 will thus proceed to move towards the left as above explained.

It will thus be evident that so long as the valve port 28 is open, the pistons 4 and 5, and their stem or rod 6 will move to and fro in their cylinders, the reversal of their movement being effected by the valve member 20 under the action of the ball 25 and its spring 26.

This movement of the pistons is transmitted to the arm 12 of the rocking lever 11 through the lugs 7 and the trunnions 14 of the pivot pin above described and the lever 11 is consequently rocked about its pivot 10 in opposite directions alternately.

The rocking movement of the lever 11 may be arranged to operate any desired device such for example as a screen-wiper but it will be understood that if desired the device to be actuated may be directly coupled to the pistons 4 or 5 or to their stem 6, the lever 11 being omitted.

Referring now to the alternative construction shown in Fig. 3, it will be seen that the control valve is in this case separate from the motor device itself and comprises a valve casing 33 provided with an internal passage 34 communicating with the chamber 27 of the motor device through a pipe 35. The passage 34 terminates in a valve port 36 surrounded by an annular valve seat 37 around which is formed an annular chamber 38 communicating with charged fluid pressure supply pipe 51 leading from the reservoir 50. A valve disk of flexible resilient material is arranged to cooperate with the valve seat 37 and is held in position at its edge by an annular washer 40. A sliding plunger 41 engages with the central portion of the valve disk 39 and is arranged to be operated by the hemispherical head 42 of a control lever or handle 43 eccentrically pivoted at 44.

The casing 33 is arranged to be mounted upon any suitable support 45 by means of an annular member 46, a spring locking ring 47 and a stirrup member 48.

In the position of the parts shown in Fig. 3, the valve disk 39 is held firmly in engagement with the valve seat 37 so as to cut off the supply of fluid through the port 36 and pipe 35 to the motor device. By reversing the handle 43 to the position indicated in dotted lines, the plunger 41 is released so that fluid under pressure in the annular chamber 38 can raise the valve disk 39 and flow through the port 36 and passage 34 and pipe 35 to the chamber 27 of the motor device. The action of this device is the same as that above described with reference to Fig. 1, but it will be understood that the control valve shown in Fig. 3 may be arranged at any suitable point so as to enable the motor device to be controlled from a distance.

The motor device illustrated in Figs. 4 and 5 and the device illustrated in Figs. 6 and 7 are each designed to control the flow of fluid under pressure to a fluid pressure responsive mechanism instead of directly actuating the mechanism as is the case with the motor shown in Figs. 1 to 3, inclusive.

Each of these two motor devices further differs from the motor device shown in Figs. 1 to 3, inclusive, in that the means for initiating the operation of the reciprocating parts directly cooperate with the piston 4 instead of controlling the admission of fluid under pressure for initiating the operation as is done in the device of Figs. 1 to 3.

Aside from the above mentioned differences the several parts of each motor device are quite similar to the corresponding parts of the motor device of Figs. 1 to 3, and where these parts are the same the same reference characters will be used in Figs. 4 to 7, inclusive, so as to simplify the disclosure.

In the motor device shown in Figs. 4 and 5, as well as in the device shown in Figs. 6 and 7, the pistons 4 and 5 are adapted to actuate a slide valve construction for controlling the alternate opening and closing of fluid conducting ports 60 and 61 leading to a fluid pressure responsive mechanism, such for instance as a two note horn, as shown in Figs. 6 and 7. As shown in Fig. 4 the slide valve construction is adapted to control the flow of fluid from the chamber 2, between the pistons, to one and then the other of the ports 60 and 61.

In this embodiment of the invention the space 32 on the outside of the piston 4 contains a dished support member 52 between the outer face of which and a head 53 a flexible diaphragm 54 is secured, a thrust member 55 being slidably mounted in the head 53 and held in engagement with the diaphragm 54 by means of a relatively strong spring 56. The outer end of the thrust member 55 is pivotally connected, in the apparatus of Fig. 4, to one arm of a lever 57, the other arm of which may be operatively connected to a control lever not shown or its equivalent whereby, when the device is to be operated, the lever 57 is rocked in the direction indicated by the arrow.

Slidably mounted in the cylinder 3 on the inner side of the piston 5 is a slide valve construction comprising a substantially cylindrical member 58 composed of metal and provided with a packing band 59 constructed of leather, rubber, or the like, and suitably secured to the member 58. The packing band 59 serves as a slide valve cooperating with valve ports 60 and 61 formed in the wall of the cylinder 3, the port 60 communicating through a suitable passage or pipe connection with the element of the two-note horn of higher pitch, while the port 61 similarly communicates with the horn element of lower pitch.

The interior of the cylinder 2 between the pistons 4 and 5 is permanently supplied with fluid under pressure through the chamber 27, as in the embodiment illustrated in Fig. 1, the plug member 62 containing the chamber 27 being connected by means of a passage 75 and suitable piping to a source of fluid under pressure, not shown.

The ball 25 in this embodiment is enclosed by a cage 63 of hexagonal cross-section, two of the sides of this cage being extended upwards, as indicated at 64, to form guides for the valve member 20, as shown in Fig. 5.

A thrust rod 65 is arranged in the passage 15 in the stem or rod 6 fitting loosely therein and provided at its left-hand end with a head 66 in engagement with the inner face of the diaphragm 54. The opposite end of the rod 65 abuts against a pin 67, mounted in the valve member 20, the operation of the device shown in Figs 4 and 5 being as follows:

So long as the control lever 51 is in its inoperative position as shown in Fig. 4, the various parts of the device occupy the position shown, the thrust member 55 maintaining the diaphragm 54 in its deflected position shown under the action of the spring 56. The pressure exerted by the spring 56 is transmitted through the diaphragm 54 and the head 66 to the thrust rod 65, which, acting on the pin 67, maintains the valve member 20 in its extreme right-hand position as shown, relative to the stem or rod 6, so that the spring actuated ball 25 acting on the ramp 24 is prevented from displacing the valve member 20 towards the left.

Under these conditions, the port 60 is covered by the packing band 59 and the port 61 is covered by the packing 68 of the piston 5. The ports 60 and 61 being thus closed, the supply of fluid under pressure from the cylinder 2 to the passages leading to, for example the high note and low note elements of the horn is cut off and the elements are thus maintained inoperative.

When it is desired to operate the horn, the control lever 57 is rocked in the direction indicated by the arrow, so as to compress the spring 56 and thereby release the thrust transmitted to the rod 65 and pin 67. The valve member 20 is accordingly moved towards the left in its guides 21, relative to the stem or rod 6, by the action of the spring 26 and the ball 25, as before described in connection with the embodiment shown in Fig. 1. The cavity 22 in the valve member 20 accordingly no longer registers with the port of the passage 16, this cavity being in communication with the groove 19 in the stem or rod 6. Fluid under pressure is accordingly supplied from the cylinder 2 through the groove 19 and cavity 22 to the passage 15, and thence to the space 32 on the outer side of the piston 4. The pistons 4 and 5, are accordingly moved towards the right, the port 61 being opened by the movement of the packing 68 and fluid under pressure is accordingly supplied from the cylinder 2 through the port 61, to the low note element of the horn. Towards the end of the right-hand movement of the pistons 4 and 5, the piston 4 engages with the left-hand end of the slide valve member 58, the continued and latter part of the piston movement causing the slide valve member 58 to move towards the right so that the packing band 59 uncovers the port 60 and covers the port 61. The supply of fluid under pressure from the cylinder 2 to the low note element of the horn is accordingly cut off, fluid being supplied from the cylinder 2 through the open port 60 to the high note element of the horn. As soon as the pistons 4 and 5 have completed their full stroke towards the right, the spring actuated ball 25, as in the embodiment illustrated in Fig. 1, acting on the ramp 23 of the valve member 20, causes this member to move towards the right, relative to the stem or rod 6, thereby interrupting the supply of fluid under pressure from the cylinder 2 to the space 32 and establishing communication with this space and the atmosphere by way of passage 15, cavity 22 and passage 16.

The pistons 4 and 5 are consequently moved towards the left and towards the end of their stroke in this direction, the piston 5 engages with the slide valve member 58, the completion of this stroke causing the slide valve member to be restored to its original position in which the port 60 is again closed by the packing band 59 so that the high note element of the horn is no longer operative.

This cycle of operations, namely, the supply of fluid to the low note element and to the high note element of the horn in succession, will evidently be continuously repeated so long as the lever 57 is actuated to prevent the thrust rod 65 from maintaining the valve member 20 in its inoperative position shown in Fig. 4.

In the modified construction shown in Figs. 6 and 7 the body 1 of the motor device is mounted upon a support or base member 69 which also carries the low note horn element 70 and the high note horn element 71 of the device. These horn elements may be of any suitable construction which need not be described in detail, since they do not form part of the invention. The support member 69 is provided with an internal passage 72 formed therein, leading from the operating chamber of the low note horn element 70 to the port 61, a similar passage 73 leading from the operating chamber of the high note horn element 71 to the port 60, it being understood that these ports are, as in the construction of Fig. 4, formed in the left-hand end of the cylinder 3.

The continuous supply of fluid under pressure to the cylinder 2, intermediate the pistons 4 and 5, is effected in the construction of Figs. 5 and 6, through a passage 74, also formed in the support member 69. The passage 74 communicating through a suitable pipe connection 76 which may be connected to any suitable source of fluid under pressure, such for instance as the reservoir 50 shown in Fig. 1.

The space within the head 53 on the outer side of the diaphragm 54 communicates through a passage 77 in a suitable pipe connection 78, with a manually operated control device, not shown, whereby the space above referred to can be supplied with fluid under pressure or vented to the atmosphere alternatively to render the device inoperative or operative, respectively.

The operation of this form of device is similar to that already described with reference to Fig. 4, except that the action of the diaphragm 54 exerted through the thrust rod 65 to maintain the valve member 20 in the position shown in Fig. 4, instead of being effected by the action of a spring 56, as in the construction of Fig. 4, is effected by fluid under pressure supplied to the space in the head 53 on the outer side of the diaphragm 54 through a manually operated control device not shown and the pipe connection 78. It will be understood that the control device, in its normal or released position, is arranged to effect the supply of fluid under pressure through the pipe connection 78 to the diaphragm 54, while when the control device is actuated to cause the operation of the horn, fluid under pressure is released from the diaphragm 54 so that the latter releases the rod 65 and permits the operation of the motor device, as already explained.

While several embodiments of the improved motor device have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. A fluid pressure motor comprising a cylinder and piston means operatively mounted in said cylinder and reciprocable longitudinally in said cylinder in response to variations in the pressures of fluid acting upon said piston means in one direction, valve means operative relative to the piston means to vary the pressure of fluid acting on said one side of the piston means, spring actuated wedging means for actuating said valve means upon substantially the full traverse of the piston means in either of its directions of travel, said valve means being movable in unison with said piston means and at the same time being movable relative to said spring actuated wedging means for substantially the full traverse of the piston means in either of its directions of travel.

2. A fluid pressure motor device comprising a chamber, two operatively connected pistons adapted to reciprocate in accordance with variations in fluid pressure in said chamber, a valve member controlled by said pistons movable between two positions for effecting the variations of fluid pressure in said chamber, means for moving said valve with said pistons during the major portion of their stroke, and spring actuated wedging means operative at the completion of the stroke of said pistons to move the valve member relative to the pistons for effecting a variation in pressure in said chamber to effect reverse movement of the pistons.

3. A fluid pressure motor device comprising a casing having disposed therein a chamber, two pistons, a stem for operatively connecting said pistons, said stem and pistons being adapted to reciprocate in accordance with variations in fluid pressure in said chamber, a valve memer having at each end an inclined ramp and slidably mounted on said stem for movement between two positions for effecting the variation of fluid pressure in said chamber, means for moving said valve with said pistons and said stem during the major portion of their stroke, and means cooperating with said ramps at the completion of the stroke of said pistons to move the valve member relative to the pistons and stem for effecting a variation in pressure in said chamber to effect reverse movement of the pistons and stem.

4. A fluid pressure motor device comprising a casing having disposed therein a chamber, two pistons, a stem for operatively connecting said pistons, said stem and pistons being adapted to reciprocate in accordance with variations in fluid pressure in said chamber, a valve member slidably mounted on said stem for movement between two positions for effecting the variation of fluid pressure in said chamber, means for moving said valve with said pistons and said stem during the major portion of their stroke, and spring actuated wedging means fixed in said casing against movement with the valve for effecting reversing movement of the valve relative to said pistons and stem at completion of the stroke for effecting a variation in pressure in said chamber to effect reverse movement of the pistons and stem.

5. A fluid pressure motor device comprising a chamber, two operatively connected pistons, adapted to reciprocate in accordance with variations in fluid pressure in said chamber, a valve member controlled by said pistons movable between two positions for effecting the variations of fluid pressure in said chamber, and spring actuated wedging means fixed in said casing against movement with the valve for effecting reversing movement of the valve, said valve being movable relative to the fixed means during the major portion of the stroke of said pistons to act to position said valve for movement by said means relative to said pistons and stem.

6. A fluid pressure motor device comprising a casing, two pistons disposed in said casing, said pistons being movable by variations in fluid pressure, a stem connecting said pistons and having provided therein one passage leading to the face of one of said pistons and another passage leading to the face of the other piston, valve means slidably mounted on said stem and movable to one position for establishing communication to said one passage through which fluid under pressure is varied to effect movement of said pistons in one direction and movable to another position to establish communication between said one and said other passage to vary the fluid pressure to effect movement of said pistons in the opposite direction, and spring actuated wedging means fixed in said casing against movement with said valve means to effect movement of said valve relative to said pistons at the completion of the stroke of said pistons.

7. A fluid pressure actuated reciprocable motor device comprising two movable pistons, one of larger area than the other, a stem operatively connecting said pistons, the outer face of the larger piston being subject to variations in pressure in a control chamber, the outer face of the smaller piston being subject to atmospheric pressure, and the inner face of both of said pistons being subject to pressure of fluid in an intermediate chamber, said stem having provided therein a passage leading to said control chamber and another passage leading to the outer face of the smaller piston, a valve member having at each end an inclined ramp and slidably mounted on said stem movable relative to said stem and said pistons and having one position for establishing communication between said one and said other passage for venting said control chamber and another position for establishing communication between said intermediate chamber and said one passage through which fluid under pressure is adapted to be supplied to said control chamber, means for selectively controlling the supply of fluid under pressure to said intermediate chamber, and spring actuated wedging means for actuating said valve member relative to said piston and stem upon substantially the full traverse of the pistons in either direction of travel of said pistons.

8. A fluid pressure actuated reciprocable motor device comprising two operatively connected pistons of different effective areas, a chamber between said pistons adapted to be charged from a constant supply of fluid under pressure for effecting operation of said pistons, the outer face of one of said pistons being subject to variations in pressure in a control chamber, the outer face of the other being subject to atmospheric pressure, and the inner face of both of said pistons being subject to the pressure of fluid in said first mentioned chamber, valve means cooperating with said pistons for operation relative thereto to vary the pressure of fluid in said control chamber upon the supply of fluid under pressure to said first mentioned chamber, a passage through which fluid under pressure is supplied to the first mentioned chamber, spring actuated wedging means disposed in said passage for actuating said valve member upon substantially the full traverse of the pistons in either direction of travel of said pistons, and means for controlling the supply of fluid under pressure through said passage for cutting the motor into and out of operation.

9. A fluid pressure motor comprising a cylinder and piston means operatively mounted in said cylinder and reciprocable longitudinally in said cylinder in response to variations in the pressure of fluid acting upon said piston means in one direction, a valve member cooperating with said piston means for operation relative thereto to vary the pressure of fluid acting on said one side of the piston means, said valve member having one face adapted to engage said piston means and an opposite face provided at each end with inclined ramps, means adapted to engage the second mentioned face of said valve member for actuating said valve member upon substantially the full traverse of the piston means in either of its directions of travel, said valve member being movable in unison with said piston means for substantially the full traverse of the piston means in either of its directions of travel.

10. A fluid pressure motor device comprising a chamber, two operatively connected pistons adapted to reciprocate in accordance with variations in fluid pressure in said chamber, valve means associated with said pistons, said means being movable with said pistons during the major portion of their stroke and being movable relative thereto between two positions for effecting the variations of fluid pressure in said chamber, a member engaging said valve, a spring for urging said member into engagement with said valve means, said spring and said member being operative at completion of the stroke to move the valve means relative to the pistons for effecting a variation in pressure in said chamber to effect reverse movement of the pistons.

11. A fluid pressure motor device comprising a casing having provided therein a cylinder and piston means operatively mounted in said cylinder and reciprocable longitudinally in said cylinder in response to variations in pressure of fluid acting upon said piston means in one direction, valve means cooperating with said piston means for operation relative thereto to vary the pressure of fluid acting on said one side of the piston means, two passages disposed in said casing, other valve means movable at all times with said piston means for alternately opening one and then the other of said passages, means for actuating said first mentioned valve means upon substantially the full traverse of the piston means in either of its directions of travel, said first mentioned valve means being movable in unison with said piston means for substantially the full traverse of the piston means in either of its directions of travel.

12. A fluid pressure motor device comprising a chamber, two operatively connected pistons adapted to reciprocate in accordance with variations in fluid pressure in said chamber, valve means associated with said pistons, said means being movable with said pistons during the major portion of their stroke and being movable relative thereto between two positions for effecting the variations of fluid pressure in said chamber, a member engaging said valve, a spring for urging said member into engagement with said valve means, said spring and said member being operative at completion of the stroke to move the valve means relative to the pistons for effecting a variation in pressure in said chamber to effect reverse movement of the pistons, and manually controlled means operative for cutting the motor into and out of operation.

13. A fluid pressure motor device comprising a chamber, two operatively connected pistons adapted to reciprocate in accordance with variations in fluid pressure in said chamber, a valve member controlled by said pistons movable between two positions for effecting the variations of fluid pressure in said chamber, means for moving said valve with said pistons during the major portion of their stroke, and means operative at completion of the stroke to move the valve member relative to the pistons for effecting a variation in pressure in said chamber to effect reverse movement of the piston, and other means associated with said pistons for rendering said valve member ineffective to effect reverse movement of said pistons and manually controlled means for controlling said last mentioned means.

14. A fluid pressure motor device comprising a chamber, two pistons, a stem connecting said pistons and adapted to reciprocate in accordance with variations in fluid pressure in said chamber, a valve member controlled by said pistons movable between two positions for effecting variations of fluid pressure in said chamber, means for moving said valve member relative to the pistons and stem for effecting a variation in pressure in said chamber to effect reverse movement of the piston, means disposed in said stem for rendering said valve member ineffective to effect reverse movement of said pistons and force exerting means disposed in said chamber for rendering said means either effective or ineffective.

15. A fluid pressure motor device comprising a chamber, two operatively connected pistons adapted to reciprocate in accordance with variations in fluid pressure in said chamber, a valve member controlled by said pistons movable between two positions for effecting the variations of fluid pressure in said chamber, means for moving said valve with said pistons during the major portion of their stroke, and means operative at completion of the stroke to move the valve member relative to the piston for effecting a variation in pressure in said chamber to effect reverse movement of the pistons, a movable abutment disposed in said chamber movable to one position upon the supply of fluid under pressure to one side thereof for rendering said valve member inoperative and movable upon the release of fluid under pressure from said one side for rendering said valve member operative.

16. A fluid pressure motor device comprising a chamber, two pistons, a stem connecting said pistons and adapted to reciprocate in accordance with variations in fluid pressure in said chamber, a valve member controlled by said pistons movable between two positions for effecting the variations of fluid pressure in said chamber, means for moving said valve member relative to the pistons and stem for effecting a variation in pressure in said chamber to effect reverse movement of the pistons, means associated with said pistons for rendering said valve member either operative or inoperative to effect reverse movement of said pistons, and spring means for controlling said means.

17. A fluid pressure actuated reciprocable motor device comprising two operatively connected pistons of different effective areas, a chamber normally charged with fluid under pressure for effecting operation of said pistons, the outer face of one of said pistons being subject to variations in pressure in a control chamber, the outer face of the other being subject to atmospheric pressure, and the inner face of both of said pistons being subject to the pressure in said first mentioned chambers, a first passage leading to said control chamber and a second passage leading to the face of said other piston, a valve member cooperating with said pistons for operation relative thereto having one position for establishing communication between said first mentioned chamber and said first passage and another position for establishing communication between said first and said second passages to effect reverse movement of the pistons, means associated with said pistons for cutting said valve into or out of operation, resilient means disposed in said control chamber for normally maintaining said valve cut out of operation, and manual means for selectively controlling said resilient means.

18. A fluid pressure motor device comprising a chamber, piston means adapted to reciprocate in accordance with variations in fluid pressure in said chamber, a valve member controlled by said piston means movable with said piston means during the major portion of the stroke in either direction of travel, said valve member having one face adapted to engage said piston means and a second face with a substantially parallel portion having at each end thereof inclined ramps, means for actuating said valve relative to said piston means between two positions for effecting variations of fluid pressure in said chamber, said means engaging said parallel portion of said valve during the major portion of the stroke and engaging one or the other of said ramps at completion of the major portion of the stroke to move said valve to one or the other of said positions to effect reverse movement of the piston means.

ANSELME NEVEU.